United States Patent

Hegwer

[15] 3,664,091
[45] May 23, 1972

[54] PROCESS AND SYSTEM FOR REMOVING ACID GAS FROM NATURAL GAS

[72] Inventor: Arnold M. Hegwer, Houston, Tex.
[73] Assignee: Fish Engineering & Construction, Inc., Houston, Tex.
[22] Filed: June 27, 1969
[21] Appl. No.: 837,106

[52] U.S. Cl..........................................55/29, 55/48, 55/55, 55/73, 62/17, 62/20, 62/39
[51] Int. Cl..................................................F25j 3/00
[58] Field of Search..................55/55, 73, 48, 29; 62/17, 20, 62/23, 24, 27, 28, 29, 39

[56] References Cited

UNITED STATES PATENTS

| | | | |
|---|---|---|---|
| 3,331,189 | 7/1967 | Worley | 55/73 |
| 3,511,027 | 5/1970 | Roberts | 55/73 |
| 2,620,895 | 12/1952 | Turner | 62/20 |
| 2,826,266 | 3/1958 | Hachmuth | 62/23 |
| 2,649,166 | 8/1953 | Porter | 62/17 |
| 3,130,026 | 4/1964 | Becker | 62/17 |
| 3,495,933 | 2/1970 | Renault | 55/73 |
| 3,531,917 | 10/1970 | Grunewald | 55/73 |
| 2,596,785 | 5/1952 | Nelly | 62/17 |
| 3,453,835 | 7/1969 | Hochgesand | 62/17 |

Primary Examiner—Wilbur L. Bascomb, Jr.
Assistant Examiner—Arthur F. Purcell
Attorney—Paul E. Harris and Lee R. Larkin

[57] ABSTRACT

A process and system for removing acid gas such as $CO_2$, $H_2S$, RSH and COS from a natural gas stream by physical absorption using a solvent which will absorb acid gas. The method and system is arranged such that the acid gas is removed from the natural gas without the aid of external refrigeration and with substantially no external heat.

8 Claims, 1 Drawing Figure

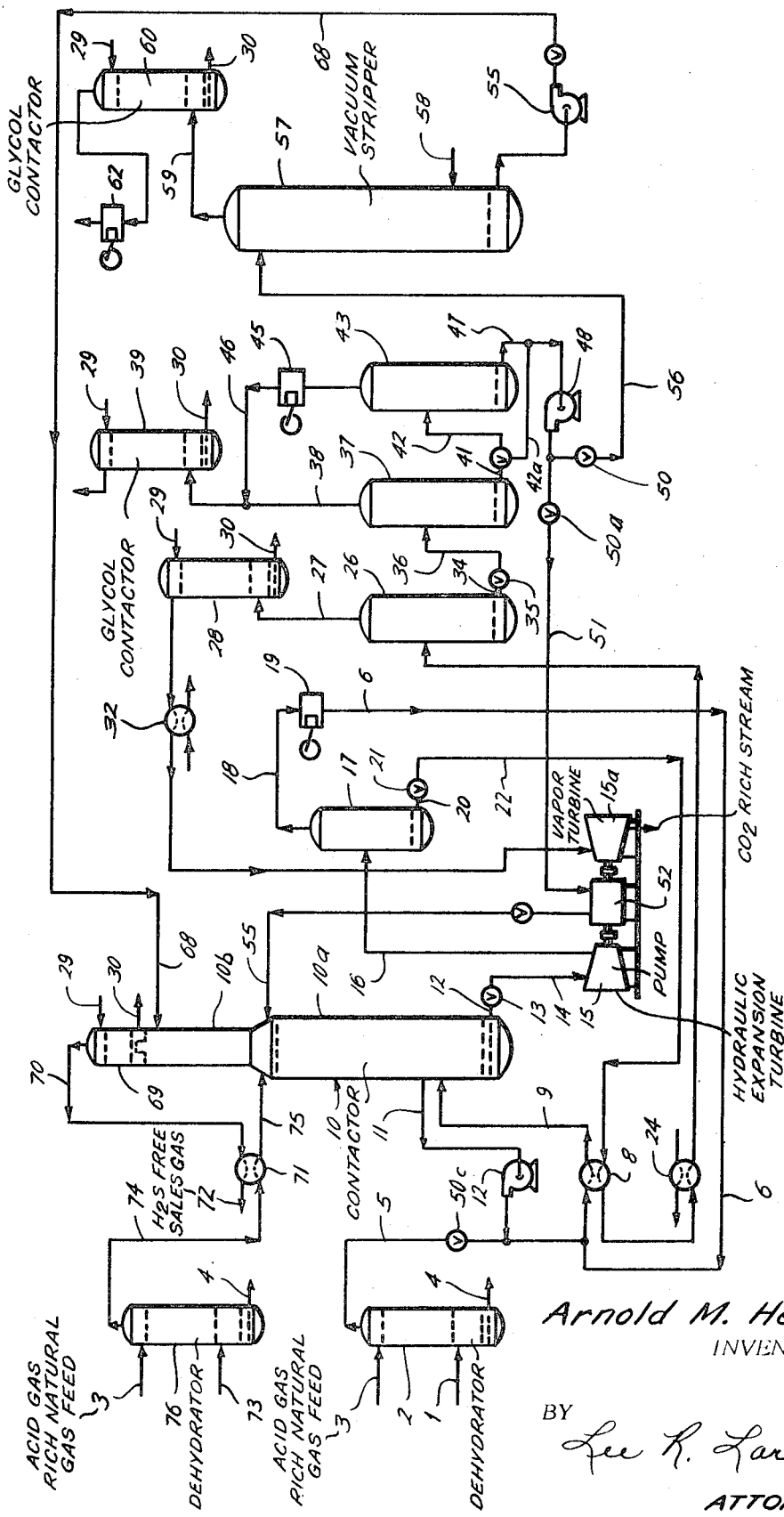

PROCESS AND SYSTEM FOR REMOVING ACID GAS FROM NATURAL GAS

BACKGROUND OF THE INVENTION

1. Field of the Invention

This invention relates to a process and system for removing acid gas from a stream of natural gas. More particularly, it relates to a process and its system for removing acid gas such as $CO_2$, $H_2S$, RSH, COS and the like, including combinations thereof, from a natural gas stream by physical absorption using a solvent which is effective to absorb acid gas. The method and system are arranged such that no mechanical refrigeration is required and little or no external heat is required to remove the acid gas from the solvent.

Natural gas of the type which is contemplated for processing in connection with this invention normally will be at a temperature range of between 40° F. and 120° F. and more usually within the range of 80° F. to 100° F. The natural gas is generally thought of as being predominately methane gas with some ethane, propane, and butanes, together with the unwanted acid gas. Acid gases which are often included in natural gas and which sometimes are required to be removed include $CO_2$, $H_2S$, RSH, COS and the like, including combinations thereof. In certain instances, the $CO_2$ content of a natural gas may be as high as from 15 to 70 percent of the natural gas. In other instances, the $H_2S$ content of a natural gas may range from 0 to 30 percent. Quite often it is necessary that the sales gas or end product gas have a $CO_2$ content of below about 3 percent and in some instances as low as 2 percent and for the $H_2S$ content to be lower than 0.25 gr./100 SCF.

2. Description of the Prior Art

Prior art methods and systems which have been devised heretofore to accomplish processing of the gas as indicated above have normally employed external refrigeration and/or the use of reboilers to provide additional heat. U. S. Pat. Nos. 3,120,993 and 3,324,627 are generally representative of the state of the art.

SUMMARY OF THE INVENTION

Briefly stated, the process of this invention for removing acid gas, such as $CO_2$, $H_2S$, RSH and COS contemplates dewatering, dehydrating or otherwise removing the water vapor from the inlet natural gas stream. Thereafter, the dehydrated inlet gas is contacted with a solvent of the type which will absorb the acid gas. This contacting is normally carried out at a pressure range of from about 400 to about 1,300 p.s.i. and more generally in the range of 600 to 1,100 p.s.i. AFter this contacting step, the rich solvent is then expanded and flowed to a first flash chamber to thereby flash off volatile gases. The volatized gases from the first flash chamber are flowed back to the contacting step as recycle. The liquid solvent from the first flash chamber is flowed to a second flash chamber, where acid gas is flashed from the solvent. In certain embodiments of the invention, the flashed acid gas may be collected and used to apply the energy thereof to operate associated equipment. Certain embodiments also contemplate the flowing of the liquid solvent from the second flash chamber to a third flash chamber to thereby volatize additional acid gas from the solvent, with the first, second and third chambers being operated at successively lower pressures.

The invention may also include heat exchanging means arranged for cooling the inlet gas before the absorption step. This heat exchanging means may also be used to cool rich solvent withdrawn from the contacting step, with the cooled solvent thereafter being returned to the contacting step.

In certain situations where it is desirable to have a low $CO_2$ content sales gas, the liquid solvent from the second flash chamber may be flowed to a vacuum chamber to volatize additional $CO_2$ gas from the solvent.

In those instances where a highly volatile solvent is used, it may be desirable to have means arranged for contacting the flashed gases from the second flash chamber with another solvent of the type which will absorb the first solvent to thereby reclaim equilibrium first solvent. In certain embodiments of the invention, the liquid solvent from the second flash chamber is flowed back to the absorption step.

In situations where the inlet gas has a relatively high $H_2S$ content and a relatively low $CO_2$ content, then at least a portion of the liquid solvent from the second flash chamber is flowed to a vacuum chamber having about 200 to about 450 mm absolute pressure. The liquid solvent is then contacted in the vacuum chamber with a stripping gas, such as air or end product sales gas, by flowing the same into the vacuum chamber to remove the hydrogen sulfide and other sulphur components from the solvent. The stripped lean solvent from the vacuum chamber is then returned to the contacting step for contact with the inlet gas.

BRIEF DESCRIPTION OF THE DRAWING

The drawing is a schematic layout of a typical system carrying out the methods of this invention and various alternatives thereof, reference to which will further explain the invention.

DESCRIPTION OF THE PREFERRED EMBODIMENTS

If the natural gas to be processed has a relatively high $CO_2$ content, such as on the order of 15 percent or higher, then such inlet gas is flowed through line 1 to the bottom portion of contactor vessel 2 where the gas stream is contacted by countercurrent flow with liquid glycol which will absorb water vapor from the natural gas, and which is supplied to the vessel 2 through line 3 and exits therefrom through line 4 at the bottom. The glycol stream exiting line 4 contains the water removed from the inlet gas and is sent to a conventional still (not shown) where the solvent is fractionated from glycol under pressure. It is to be understood that other dehydrating means may be used, as for example molecular sieves and the like, to remove the water vapor from the inlet gas. This dehydration step is important at this point in the system because it is easier to remove water from natural gas prior to acid gas removal because water is easier to remove from a small quantity of solvent, such as glycol than from a larger amount of solvent which is used to absorb the acid gas.

The inlet gas is flowed out of vessel 2 through line 5 and through heat exchanger 8 and thence to a lower point in conventional contactor 10. Contactor 10 is preferably formed with two superimposed portions designated by lower section 10a and upper section 10b. By way of example, the bottom section 10a may have 25 trays spaced at 2 foot intervals and the upper section 10b may have 35 trays spaced at 2 foot intervals. In addition, contactor 10 may have superimposed thereon at the top a solvent recovery system designated by the numeral 69, which may sometimes be referred to as the glycol contactor, the use of which is to recover equilibrium solvent if a highly volatile solvent is being used in contactor 10. One of the advantages of using a solvent such as glycol over a solvent of the water type is that residue gas will not require additional dehydration.

A line 11 is connected to a lower tray in contactor section 10a from which is drawn rich solvent which is pumped by pump 12 for comingling with inlet gas in line 5 and thereafter passed through heat exchanger 8 where it is cooled and thereafter flowed back to contactor section 10a via line 9 along with the inlet gas. A considerable amount of $CO_2$ heat of absorption is removed in exchanger 8. By removing heat of absorption externally in this manner, the heat rise is reduced in contactor 10 and a smaller solvent circulation therethrough is required. Acid gas is removed in contactor 10 by contact with a suitable solvent which is of the type which will absorb the acid gas. Generally speaking, the type of solvent contemplated will be an organic solvent of the type which will physically absorb the acid gas without reacting therewith. Examples of such solvents include dimethyl ether of diethylene glycol, dimethyl ether of triethylene glycol, dimethyl ether of tetra ethylene glycol, dimethyl ether of pentaethylene glycol, dimethyl ether of hexaethylene, dimethyl ether of heptaethylene glycol, dimethyl ether of polyethylene glycol, and n-methyl-2 pyrrolidone, and the like.

Acid gas, such as $CO_2$, is primarily removed in lower section 10a of contactor 10 by semi-lean solvent supplied through line 55 which connects with contactor 10 at an intermediate point. Contactor 10 will be operated at substantially the same pressure as the inlet gas pressure.

If the natural gas stream to be treated is relatively high in $H_2S$ and low in $CO_2$, for example 0 to 30 percent $H_2S$ and 0 to 5 percent $CO_2$, then the inlet for the natural gas to be processed is through line 73 and through glycol contactor vessel 76 which is similar to vessel 2 and in which the water is removed from the inlet gas in the same manner by flowing of a solvent such as glycol in through line 3 and out through lien 4 connected to vessel 76. The inlet gas is then passed through line 74 through heat exchanger 71 where it is heat exchanged with treated gas carried in line 70. The cooled inlet gas is then flowed through line 75 to an intermediate or midsection of contactor 10, as shown, where the $H_2S$, RSH, COS and $CO_2$ are removed in upper section 10b by contact with lean solvent supplied through line 68. Both inlets 1 and 73 may be used independently or simultaneously, depending upon the type of gases being treated.

The solvent that is vaporized by contacting with the natural gas is recovered in contactor 69 which has a supply of another solvent such as glycol supplied thereto through line 29 and removed through line 30. As stated above, one of the advantages of using a solvent such as glycol over a water recovery solvent is that residue gas will not require additional dehydration.

Contactor 10 is operated at a typical pressure range from about 400 to about 1,300 p.s.i. and more usually in the range of about 600 to about 1,100 p.s.i., and at a temperature range of from about 30° F. to about 100° F.

Rich solvent is removed from lower section 10a of contactor 10 by line 12 through a valve 13 which is arranged to maintain the desired level in contactor 10. The rich solvent is then flowed through line 14 to expansion means in the form of hydraulic turbine 15, where energy is removed from the rich solvent stream. The expanded solvent exhausts from turbine 15 through duct 16 to high pressure flash tank 17 operating in the pressure range of about 300 to about 600 p.s.i., usually. Any hydrocarbons which are dissolved in the solvent are removed by flashing from the rich solvent in flash tank 17. The vaporized gases from flash tank 17 are passed through line 18 to compressor 19 and then returned by duct 6 for comingling with the inlet gas at line 5 and then flowed through heat exchanger 8 to line 9 and to contactor 10 as recycle.

As the pressure is reduced on the rich solvent in flash tank 17, gas (principally methane) is flashed out of solution and the temperature of the rich solvent is lowered. Rich solvent is withdrawn from flash tank 17 through duct 20 controlled by level control valve 21, flowed through duct 22, through heat exchanger 8 and 24, and thence to another flash tank indicated by the numeral 26. The temperature of the solvent moving from tank 17 to tank 26 may be lowered 30° F., for example. Heat exchanger 24 is heated by hot oil from any convenient source, which heat exchanging operation is used to control the flash points in tank 26 and tank 37.

The operating pressure of intermediate pressure flash tank 26 may be on the order of approximately 200 p.s.i., for example. The acid gas (principally $CO_2$) is flashed out of solution in flash tank 26 and is flowed by line 27 through heat exchanger 32 where it may be heated with hot oil and thereafter used to drive associated equipment such as vapor turbine 15a and semi-lean solvent pump 52. Optionally, the vaporized gases from flash tank 26 may be run through glycol contactor 28 which has glycol supplied thereto through line 29 and removed therefrom through line 30 wherein equilibrium solvent is removed from the $CO_2$ by the glycol before the $CO_2$ is used as a driver gas through vapor turbine 15a.

Rich solvent is withdrawn from intermediate pressure flash tank 26 by duct 34 controlled by level control valve 35 and through duct 36 to low pressure flash tank 37. Low pressure flash tank 37 may be operated in the range of from about 2 to about 10 p.s.i.g. depending upon the requirements as to $CO_2$ content of the residue gas. A $CO_2$ content in the residue gas of approximately 3.0 to 5.0 percent (Mol) is obtained by operating in the range of about 2 to 10 p.s.i.g. When it is necessary to have the residue gas lower than approximately 3 percent (Mol) the liquid solvent from flash tank 37 is directed through valve 41 and line 42 to vacuum flash tank 43 wherein the vacuum is maintained by vacuum compressor 45, with the vaporized gases thereafter being flowed through line 46. The extent of the vacuum maintained in flash tank 43 would depend upon the desired content of $CO_2$ in the residue gas. Gases which are vaporized in low pressure flash tank 37 are flowed through line 38, and optionally through glycol contactor 39 which is similar to contactor 28 and is used for the same purpose. The glycol solvent is supplied to contactor 39 through line 29 and removed therefrom through 30. Compressor 45 compresses vapors to glycol contactor 39 operating pressure and line 46 is joined with line 38, as shown.

$CO_2$ is principally removed in flash tanks 26, 37 and 43, but most of the $H_2S$ and heavier sulphur compounds are removed by flowing a portion of the total circulating solvent from tank 43 or optionally from tank 37, through line 42a, pump 48 and line 56 to stripper column 57. Stripper column 57 is of the conventional type having vertically spaced trays and is operated under vacuum preferably in the range of about 200 to about 450 mm absolute pressure, so that the stripping can be accomplished at a low temperature on the order of 40° to 70° F.

A stripping gas, such as air or previously processed natural gas, is flowed through line 58 and upwardly through stripping column 57 for contact with the descending solvent.

The overhead from column 57 is flowed through line 59 and optionally through another glycol contactor 60 which is similar to contactor 39 and which is supplied with glycol solvent through line 29 and removed through line 30. The partial vacuum on stripping column 57 is accomplished by vacuum compressor 62. Lean solvent is pumped from the bottom of stripper column 57 by lean solvent pump 55 and thence through line 68 to the top of contactor 10. The lean solvent supplied through line 68 removes $H_2S$ and heavier sulphur compounds in upper section 10a of contactor 10.

The quantity of solvent flowed through stripper column 57 is controlled by valves 50 and 50a in lines 56 and 51, respectively. That portion of the circulating solvent which is not processed in stripper column 57 is pumped by semi-lean solvent booster pump 48 to the suction of semi-lean solvent pump 52, where it is further pumped to the mid section or intermediate point of contactor 10 through line 55, as shown.

If it is desired to have an end product gas of less than 2 percent $CO_2$, then flash tank 43 would be operated at 9 p.s.i.a., for example. It is to be understood that glycol contactors 69, 28, 39 and 60 are for the purpose of recovering a highly volatile type solvent. If a less volatile or heavier solvent is used, then these contactors would not be required.

EXAMPLE

An example of the process using a 280 molecular weight solvent that does not require a solvent recovery system is as follows: The inlet gas stream which has a high $CO_2$ content is admitted through line 1 at a rate of 200,000 MSCF/D with 47.50 Mol percent $CO_2$ and 0.5 Mol percent $H_2S$, for example. The inlet gas which has a low $CO_2$ content is admitted through line 73 at a rate of 200,000 MSCF/D with 5.07 Mol percent $CO_2$ and 0.18 Mol percent $H_2S$, for example.

The following Mol Balance tables show the composition, flow qualities and operating conditions of the more important streams of the process:

MOL BALANCE SHEET I

| | Stream numeral reference | | | | | | |
|---|---|---|---|---|---|---|---|
| | 1 | 73 | 18 | 5+6 | 72 | 12 | 20 |
| Description | Inlet gas | Inlet gas | Recycle | Cont. bottom feed | Sales gas | Cont. bottoms | H.P. flash liq. |
| Comp., mols per hour: | | | | | | | |
| $N_2$ | 70.3 | 76.9 | | 70.3 | 147.2 | | |
| $CO_2$ | 10,434.8 | 1,113.3 | 2,851.6 | 13,286.4 | 1,133.7 | 13,448.0 | 10,596.4 |
| $H_2S$ | 98.8 | 39.5 | 11.0 | 109.8 | | 170.5 | 159.5 |
| $C_1$ | 11,284.6 | 20,608.2 | 663.6 | 11,948.2 | 31,764.4 | 792.0 | 128.4 |
| $C_2$ | 8.8 | 98.8 | 1.9 | 10.7 | 104.9 | 4.6 | 2.7 |
| $C_3$ | 32.9 | 8.8 | 8.5 | 41.4 | | 51.5 | -2.9 |
| $iC_4$ | 28.5 | 13.2 | 3.2 | 31.7 | | 49.9 | 46.7 |
| Solvent | | | | | | 10,208.0 | 10,208.0 |
| Totals | 21,958.7 | 21,958.7 | 3,539.8 | 25,498.5 | 33,150.2 | 24,724.5 | 21,184.6 |
| Lbs./hr | 648,949 | 387,179 | 137,136 | 786,085 | 566,674 | 3,473,910 | 3,336,774 |
| Mol. wt | 29.55 | 17.63 | 38.74 | 30.83 | 17.09 | 140.5 | 157.5 |
| M s.c.f./d | 200,000 | 200,000 | 32,240 | 232,240 | 301,932 | | |
| G.p.m. at 60° F | | | | | | 7,099 | 6,722 |
| S.G. at 60° F | | | | | | .979 | .993 |
| Temp., °F | 100 | 100 | 56 | 90 | 80 | 70 | 56 |
| P.s.i.a | 1,015 | 1,015 | 425 | 1,010 | 990 | 1,000 | 425 |

MOL BALANCE SHEET II

| | Stream numeral reference | | | | | | |
|---|---|---|---|---|---|---|---|
| | 27 | 34 | 38 | 42 | 51 | 64 | 59 |
| Description | I.P. flash vap. | I.P. flash liq. | L.P. flash vap. | L.P. flash liq. | Semi-lean solvent | Lean solvent | Stripping gas F.M. stripper |
| Comp., mols per hour: | | | | | | | |
| $N_2$ | | | | | | | |
| $CO_2$ | 6,477.1 | 4,119.3 | 3,700.8 | 418.4 | 181.9 | | 236.5 |
| $H_2S$ | 36.1 | 123.4 | 74.0 | 49.4 | 21.5 | | 29.7 |
| $C_1$ | 122.6 | 5.8 | 5.8 | | | | |
| $C_2$ | 2.0 | .7 | .6 | .1 | | | |
| $C_3$ | 20.2 | 22.7 | 19.3 | 3.4 | 1.5 | | 1.9 |
| $iC_4$ | 11.0 | 35.7 | 23.5 | 12.2 | 5.3 | | 6.9 |
| Air | | | | | | | 962.0 |
| Solvent | | 10,208.0 | | 10,208.0 | 4,438.0 | 5,770 | |
| Totals | 6,669.0 | 14,515.6 | 3,824.0 | 10,691.5 | 4,648.2 | 5,770 | 1,235.2 |
| Lbs./hr | 289,844 | 3,046,930 | 167,722 | 2,879,208 | 1,251,755 | 1,615,600 | 39,742 |
| Mol. wt | 43.46 | 209.9 | 43.86 | 269.3 | 269.3 | 280 | 32.17 |
| M s.c.f./D | 60,741 | | 34,829 | | | | 11,250 |
| G.p.m. at 60° F | | 6,011 | | 5,602 | 2,436 | 3,137 | |
| S.G. at 60° F | | 1.01 | | 1.03 | 1.03 | 1.03 | |
| Temp., °F | 65 | 65 | 50 | 50 | 50 | 50 | 50 |
| P.s.i.a | 200 | 200 | 17 | 17 | 17 | 3.7 | 3.7 |

In the foregoing example, the contactor feed gas to heat exchangor 8 has a duty of 600,500 MBtu/Hr. If this exchangor were not used and in order to have the same solvent circulation rate, the solvent entering contactor 10 would require a temperature of 5° F. in lieu of the 50° F. temperature as required by heat exchanger 8. A temperature of 5° F. is not practical with certain solvents such as dimethyl ether glycol or n-methyl-2 pyrrolidone because at this temperature the solvents have a very high viscosity which would cause extremely low tray efficiency in contactor 10.

In the foregoing example the solvent heater 24 has a duty of 300,500 MBtu/Hr. which is 7.6 Btu per pound of acid gas removed. By contrast, a conventional amine treating plant using reboil heat requires 3,000 Btu per pound of acid gas removed. Also in this example, 3.5 Mol percent $CO_2$ is allowed in the residue gas, and therefore the operation of vacuum flash tank 43 and compressor 45 is not required.

One of the advantages of the use of the heat exchangor 8 in the arrangement shown is that cooler inlet gas or recycle gas is supplied to contactor 10, thereby requiring less solvent therein. This is in accordance with the over all objective of the invention to remove $CO_2$, $H_2S$ and heavier sulphur components without the use of external refrigeration.

While hydraulic expander 15 has been shown as one type of expansion means, other expansion means can be utilized, as for example an expansion valve. However, a hydraulic expander turbine is preferable because the energy generated thereby can be used, as for example, to run pump 52 as shown through vapor turbine 15a.

One of the advantages of flash tank 17 is that hydrocarbon loss is reduced since recycle through line 6 may be on the order of 40 to 60 percent hydrocarbons.

Since $H_2S$ and heavier sulphur components are more soluble in the solvent than $CO_2$, it is desirable to have a highly stripped solvent such as that supplied by stripper column 57 through line 68 for contacting with the inlet gas in contactor 10. One of the principal advantages of the use of stripper column 57 is that the stripping is performed under a vacuum and no heat is required to strip the $H_2S$ and the like out of the solvent. In addition, the amount of air or stripping gas required to do the stripping is reduced, thereby reducing the amount of water brought into the system therewith.

Another principal advantage of the foregoing method and system is that it provides a means for removing acid gas such as $CO_2$, $H_2S$, RSH and COS and the like from natural gas streams without the use of reboil heat in a regeneration system. In other competing processes, the reboil heat is one of the main operating expenses which is not incurred by use of the present invention.

Another advantage of the present system and method is that water contained in the natural gas is removed prior to removing the acid gas therefrom. This is more economical than removing water from a large volume of solvent. In addition, water contained in a solvent reduces the quantity of acid gas that the solvent will absorb.

By the present invention, heat of absorption is removed in heat exchanger 8 by cooling rich solvent to aid flashing out $CO_2$. Heat exchanger 8 removes heat of absorption (resulting from the mixing of inlet gas with solvent) by efficient use of heat of de-absorption of $CO_2$ and the difference of energy contained in $CO_2$ at contactor 10 in the pressure ranges of 400 to 1,300 p.s.i. and preferably 600 to 1,100 p.s.i. and the flash tank pressure specified, with the result that the quantity of solvent circulation can be reduced and the need for mechanical refrigeration is eliminated.

The gas which is volatized in flash tank 26 will have a very high $CO_2$ content and be of a pressure of approximately 200 p.s.i. This gas can be used for expansion through the turbine connected with semi-lean solvent pump 52, whereby the gas is expanded to approximately atmospheric pressure and used to drive pump 52, for example. There is normally sufficient quantity of $CO_2$ to drive solution pumps, thereby greatly reducing the energy requirements of the process.

By operating stripper column 57 under a vacuum of 200 to 450 mm of mercury absolute pressure, external heat is not required, thereby reducing the energy requirements for the process generally. Since the solvent is not heated, it is not necessary to install mechanical refrigeration.

The method and system of this invention permits the reclaiming of equilibrium solvent losses from residue gas carried in line 70 and $CO_2$ gas carried in line 31 and 40 and the $H_2S$ stripper overhead stream carried in line 59. This is accomplished by glycol contactors 69, 28, 39 and 60, in which solvent vapor is absorbed by glycol through line 29. The rich glycol is then returned by line 30 to a still (now shown) where the solvent is fractionated from the glycol under vacuum. The lean glycol is then pumped through line 29 to contactors 69, 28, 39 and 60 for solvent absorption. This provides an economical means of operation where no mechanical refrigeration is required to reduce operating temperatures to thereby reduce solvent equilibrium losses.

It is to be further understood that if the inlet gas is admitted through line 73 only, then valve 50c in line 5 would be closed, and the system would be operated without the use of contactor 2 as discussed above. In addition, and depending upon the relative quantities of $CO_2$ and sulphur components in the inlet gas, the flow of solvent through lines 56 and 51 would be controlled by operation of valves 50a and 50b. Further, in the event that flash tank 43 were not to be used, then valve 41 would be operated to direct the solvent stream through line 42a to line 47.

The foregoing description is to be construed as illustrative only and further modifications may be made in the invention as will be obvious to those skilled in the art in view of this description.

What is claimed is:

1. In a process for removing acid gas having hydrogen sulfide as a component thereof from a stream of natural gas, the combination of steps comprising:
   dehydrating said inlet natural gas stream to remove water vapor therefrom;
   contacting said dehydrated inlet gas with a glycol soluble solvent of the type that will absorb said acid gas at a pressure range of from about 400 to about 1,300 p.s.i. to thereby absorb said acid gas from said stream;
   expanding and flowing said solvent containing said acid gas to a first flash chamber to thereby flash off volatile gases;
   flowing said flashed gases from said first flash chamber back to said contacting step as recycle;
   flowing liquid solvent from said first flash chamber to a second flash chamber to thereby flash acid gas from said solvent;
   flowing liquid solvent from said second flash chamber to vacuum chamber having from about 200 to about 450 mm absolute pressure;
   flowing a stripping gas through said vacuum chamber to remove hydrogen sulfide from said solvent;
   flowing lean liquid solvent from said vacuum chamber to said first contacting step for contact with said inlet gas;
   and contacting flashed gases from said absorption tower, said second chamber, and said vacuum chamber with glycol to thereby reclaim solvent which has been vaporized.

2. In a process for removing acid gas from a stream of natural gas, the combination of steps comprising:
   dehydrating said inlet natural gas stream to remove water vapor therefrom;
   contacting said dehydrated inlet gas with a solvent of the type that will absorb said acid gas at a pressure range of from about 400 to about 1,300 p.s.i. to thereby absorb said acid gas from said stream;
   expanding and flowing said solvent containing said acid gas to a first flash chamber to thereby flash off volatile gases;
   flowing said flashed gases from said first flash chamber back to said contacting step as recycle;
   flowing liquid solvent from said first flash chamber to a second flash chamber to thereby flash acid gas from said solvent;
   withdrawing rich solvent from said first contacting step;
   mixing said withdrawn solvent with said inlet gas prior to removing any of said acid gas from said withdrawn solvent;
   heat exchanging said mixture of withdrawn solvent and inlet gas with a fluid from a subsequent step in said process to thereby cool said mixture;

3. In a process for removing acid gas from a stream of natural gas, the combination of steps comprising:
   dehydrating said inlet natural gas stream to remove water vapor therefrom;
   contacting said dehydrated inlet gas with a solvent of the type that will absorb said acid gas at a pressure range of from about 400 to about 1,300 p.s.i. to thereby absorb said acid gas from said stream;
   expanding and flowing said solvent containing said acid gas to a first flash chamber to thereby flash off volatile gases;
   flowing said flashed gases from said first flash chamber back to said contacting step as recycle;
   flowing liquid solvent from said first flash chamber to a second flash chamber to thereby flash acid gas from said solvent;
   heat exchanging said inlet gas before said absorption step with liquid solvent from said first flash chamber to thereby cool said inlet gas;
   flowing said heat exchanged liquid solvent to said second flash chamber;
   flowing semi-lean solvent from said second flash chamber back to said first contacting step for contact with said inlet gas;
   withdrawing rich solvent from said contacting step;
   mixing said withdrawn solvent with said inlet gas before said heat exchanging step and prior to removing any of said acid gas from said withdrawn solvent;
   cooling said withdrawn solvent along with said inlet gas during said heat exchanging step;
   and flowing said cooled solvent portion back to said contacting step with said inlet gas.

4. In a process for removing acid gas from a stream of natural gas, the combination of steps comprising:
   dehydrating said inlet natural gas stream to remove water vapor therefrom;
   contacting said dehydrated inlet gas with a glycol soluble solvent of the type that will absorb said acid gas at a pressure range of from about 400 to about 1,300 p.s.i. to thereby absorb said acid gas from said stream;
   expanding and flowing said solvent containing said acid gas to a first flash chamber to thereby flash off volatile gases;
   flowing said flashed gases from said first flash chamber back to said contacting step as recycle;
   flowing liquid solvent from said first flash chamber to a second flash chamber to thereby flash acid gas from said solvent;
   heat exchanging said inlet gas before said absorption step with liquid solvent from said first flash chamber;
   flowing said heat exchanged solvent to said second flash chamber;
   flowing the liquid solvent from said second flash chamber to a third flash chamber to thereby flash additional acid gas from said solvent;
   flowing liquid solvent from said third flash chamber to another vacuum chamber to flash additional acid gas therefrom;

and contacting flashed gases from said second and third flash chambers with liquid glycol to reclaim said solvent which has been vaporized.

5. In a process for removing carbon dixoide, hydrogen sulfide, and heavier sulphur components from natural gas, the combination of steps comprising:

dehydrating said inlet natural gas stream to remove water vapor therefrom;

cooling said dehydrated gas by heat exchange with a fluid from a subsequent step in said process;

flowing said cooled dehydrated gas to an intermediate point in an absorption tower;

flowing lean solvent of the type which will absorb carbon dioxide and said sulphur components into an upper point in said tower and thence downwardly in countercurrent flow with said inlet gas, to thereby absorb carbon dioxide and said sulphur components from said inlet gas;

expanding and flowing rich solvent from said tower to a first flash chamber to thereby flash off volatile gases;

flowing flashed gases from said first flash chamber back to a lower point in said tower as recycle;

flowing liquid solvent from said first flash chamber to a second flash chamber to flash carbon dioxide therefrom;

flowing a portion of the semi-lean liquid solvent from said second flash chamber back to an intermediate point in said tower and thence downwardly in countercurrent flow to said recycle gas;

flowing another portion of the semi-lean liquid solvent from said second flash chamber to a vacuum chamber having from about 200 to about 450 mm absolute pressure;

flowing a stripping gas through said vacuum chamber to strip said sulphur components from said solvent;

and, flowing stripped liquid solvent from said vacuum chamber to said tower as said lean solvent.

6. The invention as claimed in claim 5 including:
contacting flashed gases from said tower, said second chamber, and said vacuum chamber with liquid glycol to reclaim equilibrium first solvent.

7. The invention as claimed in claim 5 including:
recompressing and cooling said flashed gases from said first flash chamber before recycling thereof back to said tower.

8. The invention as claimed in claim 5 including:
withdrawing a rich solvent from said tower;
mixing said withdrawn solvent with said inlet gas;
heat exchanging said mixture of withdrawn solvent and inlet gas with a fluid from a subsequent step in said process to thereby cool said withdrawn portion;
and, flowing said cooled mixture to said tower.

* * * * *